United States Patent Office 3,178,613
Patented Apr. 13, 1965

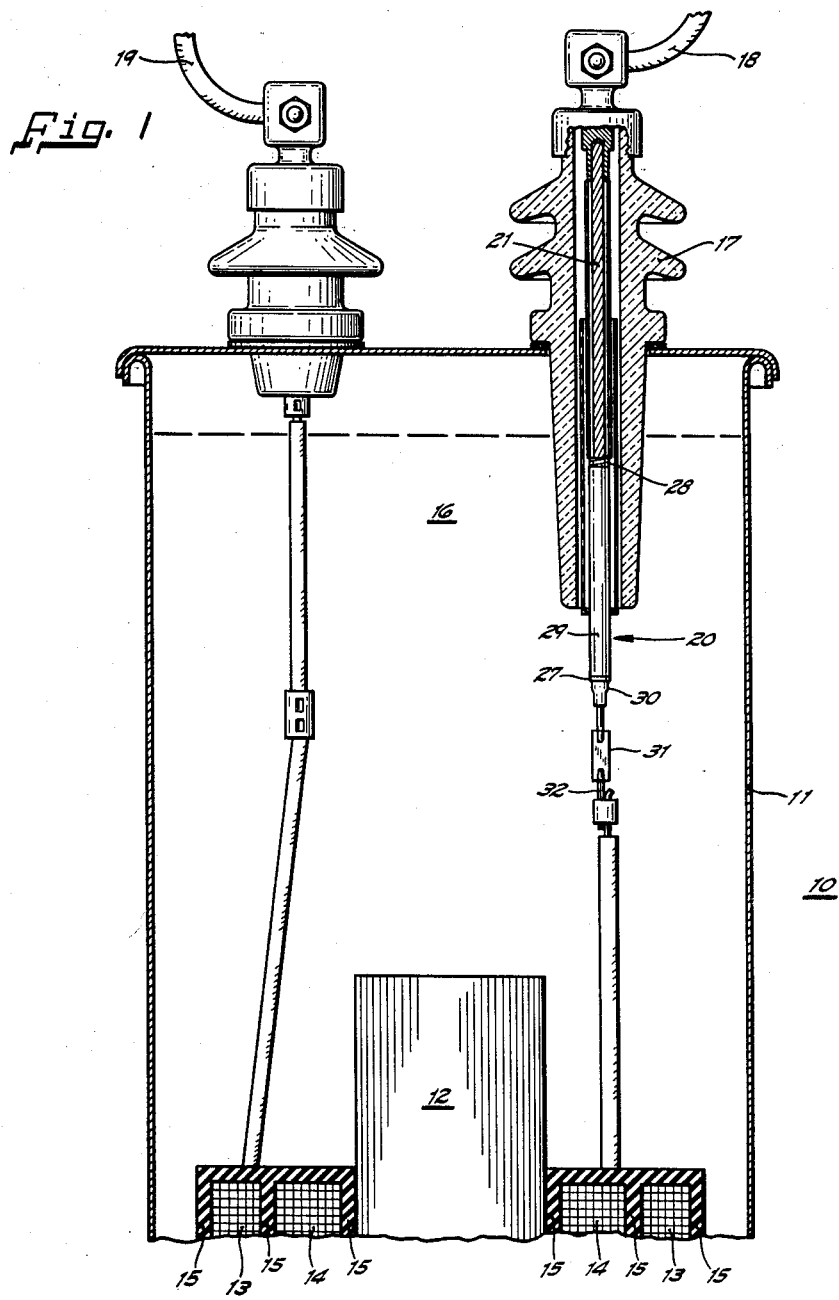

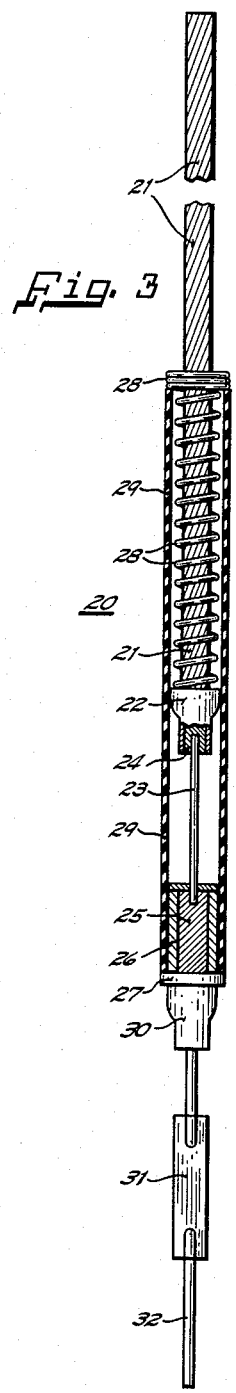
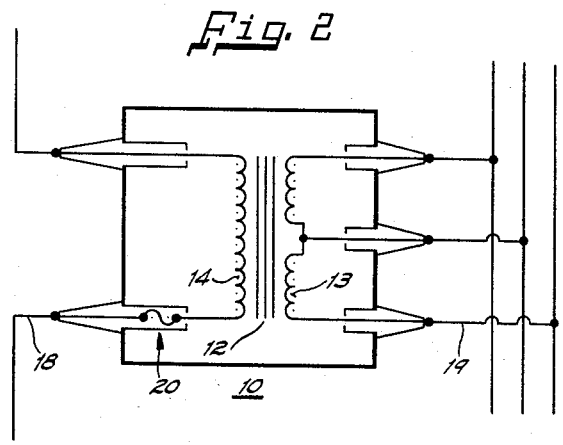
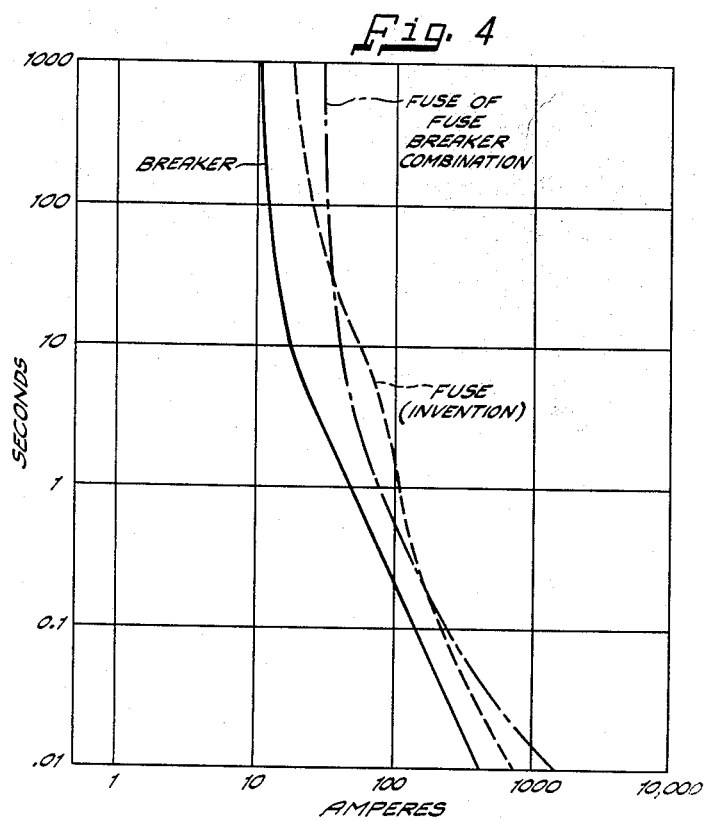

3,178,613
TRANSFORMER FUSE
Herbert W. Dornbush, Canonsburg, Pa., and Burton M. Gallaher, Fort Worth, Tex., assignors to McGraw-Edison Company, Milwaukee, Wis., a corporation of Delaware
Filed Sept. 1, 1961, Ser. No. 135,487
8 Claims. (Cl. 317—15)

This invention relates generally to protective devices designed to protect electrical apparatus and more particularly to a fuse capable of protecting a transformer against internal failures, overloads of both the short circuit and long time variety and incipient faults.

Distribution transformers since they involve a relatively large capital expense must be protected from various electrical disturbances. At the same time continuity of service is important particularly in large metropolitan areas. An apparent dichotomy arises between maximum transformer protection and maximum service continuity. To solve this problem a compromise must be reached as between the two somewhat conflicting goals.

One contemporary means of protecting a distribution transformer against lightning disturbances utilizes external and ground gaps or conventional lightning arresters. To protect against other contingencies a primary fuse link and a secondary breaker are coordinated one with the other so that on internal faults the fuse link blows while on overloads and low faults the breaker operates to open the circuit. This fuse breaker combination has proved to be relatively successful in protecting the transformer. However, due largely to the cost of the breaker, many people are of the opinion that the cost of the combination exceeds the value of the protection obtained. As a result many conventional transformers are operated without secondary breakers. Where secondary breakers have been utilized they have on occasion either mechanically or electrically malfunctioned due to their relatively involved construction.

It has therefore become clear that in many installations the fuse breaker combination has become a relatively expensive luxury. Consequently there has been evolved a need for a device which will provide approximately the same protection that the fuse-breaker combination does at a lesser cost. In response to this need we have found that a specifically designed fuse will solve this problem. The fuse we propose is much less expensive than conventional protective systems and more reliable in that it is not subject to the mechanical malfunctions that conventional devices are prone to.

It is therefore an object of this invention to provide an inexpensive reliable method of transformer protection.

Another object of this invention is to provide a transformer protective device which may be installed with a minimum of difficulty and which once installed is not prone to mechanical and/or electrical malfunction.

A further object of this invention is to provide a protective device which will simplify transformer protection.

A further object of this invention is to provide a transformer protective device which will protect the transformer against damage due to internal failures, overloads and incipient faults.

A still further object of the invention is to provide a transformer protective device which will operate to prevent dangerous pressure increases within the transformer from damaging same.

A still further object of the invention is to provide a transformer protective device which may be easily adapted to a relatively wide range of transformer sizes.

Other objects and advantages of the invention described herein will be apparent from the following description of the preferred embodiment of the invention taken in connection with the accompanying drawings in which:

FIG. 1 is a view in cutaway elevation of the invention installed in a conventional distribution transformer;

FIG. 2 is a diagrammatic view of an electrical transformer and the fuse of this invention embodied therein;

FIG. 3 is a view in cutaway elevation of the fuse of this invention; and

FIG. 4 is a time-current chart showing a form the curve of the fuse of this invention may take as compared to the curves of the conventional link-breaker combination.

Referring now to FIGURE 1 there is indicated a distribution transformer 10 having a casing 11 and a core 12 which may be of steel and which is in electrical contact with the casing 11. As is conventional, the transformer 10 comprises a primary or high voltage winding 14 and a secondary or low voltage winding 13. Insulation between the windings and the casing and between the windings themselves is indicated generally at 15. Within the transformer casing 11 and surrounding and covering the windings 13 and 14 is a quantity of insulating fluid 16 which has for its purpose the cooling of the transformer. This fluid while generally oil may equally be any other substances which adequately perform the indicated function including gases such as nitrogen $C_3F_8$, $SF_6$ or the like. It is also conceivable that the transformer or portions thereof could be encapsulated or partially encapsulated but this is not shown to shorten the disclosure and to facilitate the understanding thereof.

A high voltage bushing 17 extends thru the casing 11 in relatively close proximity to the winding 14. The incoming line 18 is fed thru the bushing 17 and electrically connected to the primary winding 14. A plurality of secondary leads 19 are interconnected to the secondary winding and to the customers' service lines.

The fuse 20 of this invention is inserted in the primary circuit in the bushing 17 in such a manner that a portion thereof is immersed in the liquid. While it is entirely possible to completely immerse the fuse in the fluid it is preferred on the basis of space and convenience to partially insert it in the bushing so that a portion of the fuse extends out of the bushing into the transformer confines.

From FIG. 2 it can be seen that the fuse 20 is inserted serially with the line 18 on the line side of the primary winding 14. The absence of a fuse or breaker on the secondary side of the transformer should be particularly noted.

Lightning arresters or spark gaps which provide protection against lightning surges both on the primary and secondary sides of the transformer are not illustrated as the practice is well understood. Furthermore, the invention described herein is independent of such devices though it is expected that such devices will be utilized with this invention in accordance with accepted protective techniques.

In FIGURE 3 the fuse is indicated at 20 and comprises a flexible current carrying leader 21 which is for example soldered or otherwise mechanically and electrically affixed at its upper end to the incoming lead. The other or lower end of the leader is crimped into a leader terminal member 22. A high melting point element 23 which is shown as a wire but which may for certain applications be a notched or perforated strip of the well-known variety is, at its upper end, also inserted in the member 22 and affixed thereto by a low melting point alloy 24. The low melting point alloy 24 has, for reasons which will subsequently be explained, a melting point of approximately 138° C.

The lower end of the high melting point element 23 is affixed as by solder connection 25 to a tubular absorber member 26 which has the prerequisite characteristic of absorbing relatively large quantities of heat. The function of the member 26 is to absorb heat from the solder connection 25 so that this connection will not melt prior to the melting of the low melting point fusible alloy 24. While member 26 is illustrated it is entirely possible to eliminate it by utilizing a solder having a sufficiently high melting temperature above that of the low melting point fusible alloy 24.

A retaining ring 27 is placed in the vicinity of the member 26 and serves as a stop for a gas evolving tube 29 which may be of fiber. A spring 28 surrounds a portion of the fuse leader and is affixed to the leader terminal member 22 and positioned within the fuse tube 29 so that it urges both the low melting and high melting point elements apart. The fluid within the transformer casing is allowed to enter the confines of the gas evolving tube and is in intimate contact with the elements 23 and 24.

A conductor member 30 is positioned in mechanical and electrical contact with the solder connector 25. A heater or resistor tailoring member 31 is joined to the conductor 30 and serves, in essence, to improve and refine the electrical characteristics of the high melting point element. A lead 32 serves to electrically connect the assembly to the primary winding 14 of the transformer.

As can be seen, the oil or other liquid within the transformer is intended to surround a goodly portion of the fuse assembly within the fuse tube. The fact that the liquid is in close proximity to the fusible elements aids in the extinction of the arcs struck subsequent to link rupture as well as making portions of the assembly responsive to the liquid temperature. In those cases where an insulating liquid is not used the assembly should be positioned in such a manner with respect to the transformer that at least a portion of the assembly is subject to the inernal transformer temperature.

In operation the high melting point element is designed to rupture on current magnitudes in the nature of secondary short circuits or major faults within the transformer. The high melting point element is, then, intended to be responsive to currents of from 20–40 times normal load current which may be of a relatively short duration.

The low melting point element on the other hand is responsive to overloads and internal transformer faults of considerably longer duration involving currents from 8–20 times normal load current.

Another and the last known contingency involves relatively small value incipient internal faults that will not produce sufficient current to cause element rupture but which will in time, produce enough heat within the transformer to melt the low melting point element prior to dangerous pressure buildup occurring in the transformer tank. These currents would normally be less than 8 times normal load current. The heating of the fluid within the transformer casing as a result of these incipient faults if carried far enough will occasion a transformer explosion. In order to prevent this from happening the low melting point element is designed to "blow" at approximately 138° C. or when, in other words, the pressure within the transformer casing reaches a value between 12 and 15 pounds per square inch.

Upon rupture of the element 23, the resulting arc is lengthened by the separating action of spring 29 and extinguished as a result of the gases evolved from the tube 29. The fact that the relatively cool oil or other medium is in proximate relation to the arc also aids in the extinction of same. Upon rupture of the low melting point element 24, the sequence of operation is the same except that a lesser volume of gas will be evolved from the fuse tube. In some cases the mere lengthening and consequent constriction of the arc, by way of the spring action, will suffice to extinguish the arc at the first current zero.

From the foregoing description it should be obvious that the described device provides an exceedingly simple scheme for protecting a distribution transformer against all known transformer fault and overload conditions.

Referring now to FIG. 4, the relative characteristics of one form of the described fuse are illustrated in comparison with the prior art fuse-breaker combinations.

In the chart, normal oil temperature is considered to be 60° C., the secondary breaker current has been converted to the equivalent primary current, and the transformer to be protected is a 25 kva. single phase, 60 cycle, 7200 volt distribution transformer. From the chart (T–C diagram) it can be seen that the fuse of this invention provides approximately the same protection that the prior art did. This is true despite the simplicity, inexpensiveness, and reliability of the instant concept.

While the illustrated curve is shown to be on the high amperage side of the conventional secondary breaker it is possible to vary the position of this curve both above and below the breaker curve according to the degree of protection desired.

While a particular embodiment of the invention has been shown and described, it will be obvious to those skilled in the art that various changes and modifications can be made therefrom without departing from the invention and, therefore, it is intended for the appended claims to cover all such changes and modifications as fall within the true spirit and scope of the invention.

We claim:

1. In an electrical distribution transformer, in combination, a casing susceptible to damage from excessive pressure within said casing, dielectric fluid within said casing, a magnetic core immersed in said fluid, primary and secondary transformer windings linking said core, a fuse immersed in said fluid and having high and low melting temperature fusible elements in series with said primary winding, said high melting temperature fusible element being rupturable in response to short duration overload currents of greater than approximately twenty times normal current through said primary winding, said low melting temperature fusible element being rupturable in response to $I^2R$ heating by relatively longer duration overload currents of greater than approximately eight times said transformer primary normal current, said second fusible element having a low melting point and being operable to open the circuit to said primary winding in response to overheating of said fluid resulting from an overcurrent of still longer duration and of a magnitude less than approximately eight times said transformer primary normal current before sufficient pressure is developed within said casing to damage said casing as a result of said overheating.

2. The combination of claim 1 wherein said low melting temperature fusible element has a melting point of approximately 138° C.

3. In an electrical distribution transformer, in combination, a casing susceptible to damage from an internal pressure greater than approximately 12 pounds per square inch, dielectric fluid within said casing, a magnetic core immersed in said fluid, primary and secondary transformer windings linking said core, a fuse immersed in said fluid and having first and second fusible elements in series with said primary winding, said first fusible element being rupturable in response to short duration overload currents of greater than approximately twenty times normal current through said primary winding, said second fusible element being rupturable in response to $I^2R$ heating by relatively longer duration overload currents of greater than approximately eight times said normal transformer primary current, said second fusible element having a low melting point and being operable to open the circuit to said primary winding in response to overheating of said fluid, caused by an overcurrent of still longer duration and of a magnitude less than approximately eight times said transformer primary normal current, sufficient to increase the internal pressure within said casing to greater than approximately 12 pounds per square inch.

4. In an electrical distribution transformer, in combination, a casing, dielectric fluid within said casing, a magnetic core immersed in said fluid, transformer primary and secondary windings linking said core, a fuse immersed in said fluid and having low melting temperature and high melting temperature fusible elements in series with said primary winding, said high melting temperature fusible element being rupturable in response to short duration overload currents of greater than approximately twenty times normal transformer primary current, said low melting temperature fusible element being responsive to the temperature of said dielectric fluid and $I^2R$ heating resulting from the flow of transformer primary current through said fuse and being rupturable in response to $I^2R$ heating by relatively longer duration overload currents of greater than approximately eight times said normal transformer primary current, said low melting temperature fusible element having a low melting point and being operable to open the circuit to said primary winding in response to the overtemperature of said fluid caused by incipient fault currents of still greater duration and of a magnitude less than approximately eight times said transformer primary normal current.

5. In an electrical distribution transformer, in combination, a casing susceptible to damage from excessive internal pressure within said casing, a transformer core and coil assembly within said casing including a magnetic core and primary and secondary windings linking said core, a dielectric liquid filling said casing above said core and coil assembly, and a fuse assembly within said casing partially immersed in said liquid and having first and second fusible elements in intimate contact with said liquid and in series electrical relation with said primary winding, said first fusible element being a relatively high temperature acting element and being operable to open the circuit to said primary winding in response to short duration overcurrents of greater than approximately twenty times normal primary current, for said transformer, said second fusible element being operable to open the circuit to said primary winding in response to $I^2R$ heating by relatively long duration overcurrents of greater than approximately eight times said normal primary transformer current, said second element being constituted solely by a body of solder affixed to said first element and having a relatively low melting point and being operable to open the circuit to said primary winding in response to overheating of said dielectric liquid by currents of still longer duration and of a magnitude less than approximately eight times said normal primary current before sufficient pressure is developed within said casing to damage said casing.

6. In an electrical distribution transformer, in combination, a casing susceptible to damage from excessive pressure within said casing, a transformer core and coil assembly within said casing including a magnetic core and primary and secondary windings linking said core, a dielectric liquid filling said casing above said core and coil assembly, and a fuse assembly within said casing immersed in said liquid and having first and second fusible elements in intimate contact with said liquid and in series electrical relation with said primary winding, said first fusible element being operable to open the circuit to said primary winding in response to $I^2R$ heating by short duration overcurrents of greater than approximately twenty times normal current for said primary winding, said second fusible element being rupturable in response to $I^2R$ heating and to the temperature of said liquid and being operable to open the circuit to said primary winding in response to $I^2R$ heating by relatively long duration overcurrents of greater than approximately eight times said primary winding normal current, said second element having a relatively low melting point and being operable to open the circuit to said primary winding in response to overtemperatures of said liquid resulting from overcurrents of still greater duration and of less than approximately eight times said primary winding normal current and prior to heating of said liquid to a sufficiently high temperature to develop a pressure within said casing which will damage said casing.

7. In a distribution transformer, in combination, a casing susceptible to damage from internal pressures greater than approximately 12 pounds per square inch, a transformer core and coil assembly within said casing including a magnetic core and primary and secondary windings linking said core, a dielectric liquid filling said casing above said core and coil assembly, and a fuse assembly within said casing immersed in said liquid and having a first high melting temperature fusible element and a second low melting temperature fusible element in intimate contact with said liquid and in series electrical relation with said primary winding, said first fusible element being operable to open the circuit to said primary winding in response to $I^2R$ heating by short duration overcurrents of greater than approximately twenty times normal current through said transformer primary winding, said second fusible element being operable to open the circuit to said primary winding in response to $I^2R$ heating by relatively long duration overcurrents of greater than approximately eight times said normal transformer primary winding current, said second element having a relatively low melting point and also being operable to open the circuit to said primary winding in response to overtemperatures of said liquid resulting from the flow of overcurrents of still greater duration and of less than approximately eight times said transformer primary normal current prior to heating of said liquid to a sufficiently high temperature to develop a pressure greater than approximately 12 pounds per square inch pressure within said casing, said fuse assembly also including a heat absorbing element in heat exchange relation with said first element and spaced from said low melting temperature fusible element.

8. In an electrical distribution transformer, in combination, a casing, a transformer core and coil assembly within said casing including a magnetic core linked by primary and secondary windings, a dielectric insulating liquid within said casing surrounding said core and coil assembly, and a fuse within said casing immersed in said liquid and in series relation with said primary winding, said fuse including a relatively high melting temperature fusible wire element, a relatively low melting temperature fusible element comprising a mass of solder affixed to said fusible wire, a tube of insulating material adapted to evolve gas in the presence of an arc surrounding said wire and said solder mass fusible elements, means engaging one end of said tube and one of said fusible elements for preventing movement of said one fusible element relative to said tube, spring means disposed within said tube and engaging the other end of said tube and the other one of said fusible elements for resiliently biasing said other fusible element toward movement within said tube incident to rupture of one of said fusible elements, said fusible wire being rupturable in response to $I^2R$ heating by short circuit current through said fuse greater than approximately twenty times the normal current of said primary winding, said solder mass being rupturable in response to I²R heating by current through said fuse of longer duration than said short circuit current and of a magnitude greater than approximately eight times said primary winding normal current and also being rupturable in response to overheating of said liquid caused by a current of still greater duration and of a magnitude less than approximately eight times said primary winding normal current.

References Cited by the Examiner
UNITED STATES PATENTS

| | | | |
|---|---|---|---|
| 2,453,396 | 11/48 | Yonkers | 200—123 |
| 2,493,601 | 1/50 | Smith | 200—123 |
| 2,663,825 | 12/53 | Amundson | 317—40 X |
| 2,665,349 | 1/54 | Sander | 200—123 |
| 2,937,253 | 5/60 | Smith | 200—113.3 |

SAMUEL BERNSTEIN, *Primary Examiner.*